United States Patent
Suen et al.

(10) Patent No.: US 8,054,769 B2
(45) Date of Patent: Nov. 8, 2011

(54) WIRELESS SENSING CONTROL NETWORK SYSTEM AND OPERATING METHOD THEREOF

(75) Inventors: Tain-Wen Suen, Longtan Shiang (TW); Yu-Shan Lin, Longtan Shiang (TW); Feng-Yu Chang, Kaohsiung (TW); Ming-Town Lee, Bangiao (TW)

(73) Assignee: Chung-Shan Institute of Science and Technology Armaments Bureau, Ministry of National Defense, Taoyuan County (TW)

( * ) Notice: Subject to any disclaimer, the term of this patent is extended or adjusted under 35 U.S.C. 154(b) by 463 days.

(21) Appl. No.: 12/390,483

(22) Filed: Feb. 22, 2009

(65) Prior Publication Data

US 2010/0214994 A1    Aug. 26, 2010

(51) Int. Cl.
*H04B 7/00* (2006.01)
(52) U.S. Cl. .......................................... 370/310; 340/3.6
(58) Field of Classification Search ........................ None
See application file for complete search history.

(56) References Cited

U.S. PATENT DOCUMENTS

| | | | |
|---|---|---|---|
| 7,830,834 B2 * | 11/2010 | Das et al. | 370/329 |
| 7,899,074 B2 * | 3/2011 | Park et al. | 370/438 |
| 2004/0233858 A1 * | 11/2004 | Karaoguz | 370/254 |
| 2007/0110001 A1 * | 5/2007 | Ting et al. | 370/332 |
| 2008/0137572 A1 * | 6/2008 | Park et al. | 370/310 |
| 2008/0291854 A1 * | 11/2008 | Sim et al. | 370/310 |
| 2009/0059919 A1 * | 3/2009 | Kim et al. | 370/389 |
| 2009/0073925 A1 * | 3/2009 | Rentel et al. | 370/329 |
| 2009/0207747 A1 * | 8/2009 | Kim et al. | 370/252 |
| 2009/0262665 A1 * | 10/2009 | Kim et al. | 370/254 |
| 2010/0061272 A1 * | 3/2010 | Veillette | 370/254 |
| 2010/0070100 A1 * | 3/2010 | Finlinson et al. | 700/295 |
| 2010/0111000 A1 * | 5/2010 | Saidi et al. | 370/329 |

* cited by examiner

*Primary Examiner* — Min Jung

(57) ABSTRACT

The invention provides a wireless sensing control network system and method for controlling an electronic device. The wireless sensing control system is a three-layer system which comprises a main controlling node, converting nodes and terminal nodes. Particularly, the wireless sensing control network system of the invention provides: (1) channel-management and changing method; (2) auto-configuration method; (3) terminal node configuration method; (4) terminal node pairing method; (5) network control method and (6) technology for distinguishing between correct signal and error signal.

17 Claims, 7 Drawing Sheets

| 1 | 0 | 1 | 0 | 1 | 1 | 1 | X |
|---|---|---|---|---|---|---|---|
| 1 | 1 | 1 | 1 | 1 | 1 | 1 | X |

| 0 | 1 | 0 | 1 | 0 | 0 | 0 | X |
|---|---|---|---|---|---|---|---|

FIG. 8A

| 1 | 0 | 1 | 0 | 1 | 1 | 1 | X |
|---|---|---|---|---|---|---|---|
| 1 | 0 | 1 | 0 | 1 | 1 | 1 | X |

| 0 | 0 | 0 | 0 | 0 | 0 | 0 | X |
|---|---|---|---|---|---|---|---|

FIG. 8B

WIRELESS SENSING CONTROL NETWORK SYSTEM AND OPERATING METHOD THEREOF

BACKGROUND OF THE INVENTION

1. Field of the Invention

The present invention relates generally to a wireless sensing control network system, and more particularly, the present invention relates to a wireless sensing control network system and an operating method thereof to make use of three-layer system wireless controlling structure, channel-management and changing method, technology for distinguishing between correct signal and error signal to improve the stability of the system and provide the system with auto-configuration, which is easily set up by a user himself.

2. Description of the Prior Art

With promoting technology, the wireless communication controlling technique is constantly brought forth the new from old theories, from the infrared technique in the past to Bluetooth and Wi-Fi technique, etc. The convenience brought out by the wireless communication technique makes wireless electronic goods become more and more popular.

Nowadays, with the craze of the wireless, the interconnection network between electronic apparatuses by means of wired or single-to-single electronic apparatus has been substituted by wireless network sensing and control system. However, there is no wireless network sensing control system with simple structure, easily set up and controlled, which meets the requirement for household DIY products; there is no easy channel-management mechanism to avoid the disturbance of other wireless electronic apparatuses; there is no mechanism for distinguishing between correct and error signals. That is to say, the wireless network sensing control system needs setting up by professionals, and some problems may happen afterward such as disturbance or unstable control.

SUMMARY OF THE INVENTION

Accordingly, an aspect of the present invention is to provide a wireless sensing control network system which could build up a three-layer wireless control system by means of the communication network to control terminal apparatuses. Wherein a terminal node of the wireless sensing control network system communicates with the main controlling node and the converting nodes automatically, so that the disadvantage in the prior art that the system needs setting up by professionals is thus improved.

According to an embodiment, the wireless sensing control network system of the invention is used for controlling electronic devices. The wireless sensing control network system comprises a main controlling node, a plurality of converting nodes and a plurality of terminal nodes. The main controlling node scans a plurality of communication channels to establish and store a list of pointers for clean or undisturbed channels based on the plurality of communication channels, and to select a present communication channel; the main controlling node generates a controlling signal and outputs the controlling signal through the present communication channel. The converting nodes scan a plurality of communication channels for receiving the controlling signal and the list of pointers for clean or undisturbed channels from the main controlling node and storing the list of pointers for clean or undisturbed channels, communicate with the main controlling node through the present communication channel according to the controlling signal, and generate a driving signal according to the controlling signal. The terminal nodes are connected to the electronic device, scan the plurality of communication channels to connect the present communication channel, receive the driving signal and the list of pointers for clean or undisturbed channels from the present communication channel and store the list of pointers for clean or undisturbed channels, and transmit a response signal to the converting node through the present communication channel to communicate with the converting node through the present communication channel.

When the converting node and the terminal node are communicating with each other through the present communication channel, the converting node transmits the driving signal to the terminal node through the present communication channel to make the terminal node to drive the electronic device to operate according to the driving signal.

Another aspect of the invention is to provide a wireless sensing control method which could build up a three-layer wireless control system by means of the communication network to reach the purpose of controlling terminal apparatuses. Wherein a terminal node of the wireless sensing control network system communicates with the main controlling node and the converting nodes automatically, so that the disadvantage in the prior art that the system needs setting up by professionals is thus improved.

According to an embodiment, the wireless sensing control method of the invention is applied to a wireless sensing control network system for controlling an electronic device. The wireless sensing control network system comprises a main controlling node, a converting node and a terminal node connected to the electronic device. The wireless sensing control method comprising the following steps: firstly, step (a) is performed to control the main controlling node to scan a plurality of communication channels to establish and store a clean channel pointer list, select one present communication channel according to the clean channel pointer list, and transmit a controlling signal through the present communication channel. Secondly, step (b) is performed to control the converting node to scan the plurality of communication channels to receive the controlling signal and the clean channel pointer list and store the clean channel pointer list, generates a driving signal according to the controlling signal, and transmits the driving signal through the present communication channel. Subsequently, step (c) is performed to control the terminal node to scan the plurality of communication channels to receive and store the clean channel pointer list, select the present communication channel according to the clean channel pointer list to receive the driving signal, and transmit a response signal to the converting node through the present communication channel to complete the auto-configuration with the converting node through the present communication channel. Finally, step (d) is performed to drive the electronic device to operate according to the driving signal when the terminal node is communicating with the converting node through the present communication channel.

To summarize, the wireless sensing control network system and operating method thereof could build up a three-layer wireless control system by means of the communication network, which achieves (1) channel-management and channel-changing method; (2) auto-configuration method; (3) terminal node configuration method; (4) terminal node pairing method; (5) network control method and (6) technology for distinguishing between correct signal and error signal. Wherein the terminal node of the wireless sensing control network system communicates with the main controlling node and the terminal nodes automatically, and the main controlling node could automatically scan and select appropriate communication channel for the wireless sensing control network system, so that the disadvantage in the prior art that the system needs setting up by professionals is thus improved.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

FIG. 8A illustrates distinguishing an error signal in the invention.

FIG. 8B illustrates correcting an error signal in the invention.

DETAILED DESCRIPTION OF THE INVENTION

Figure 1:
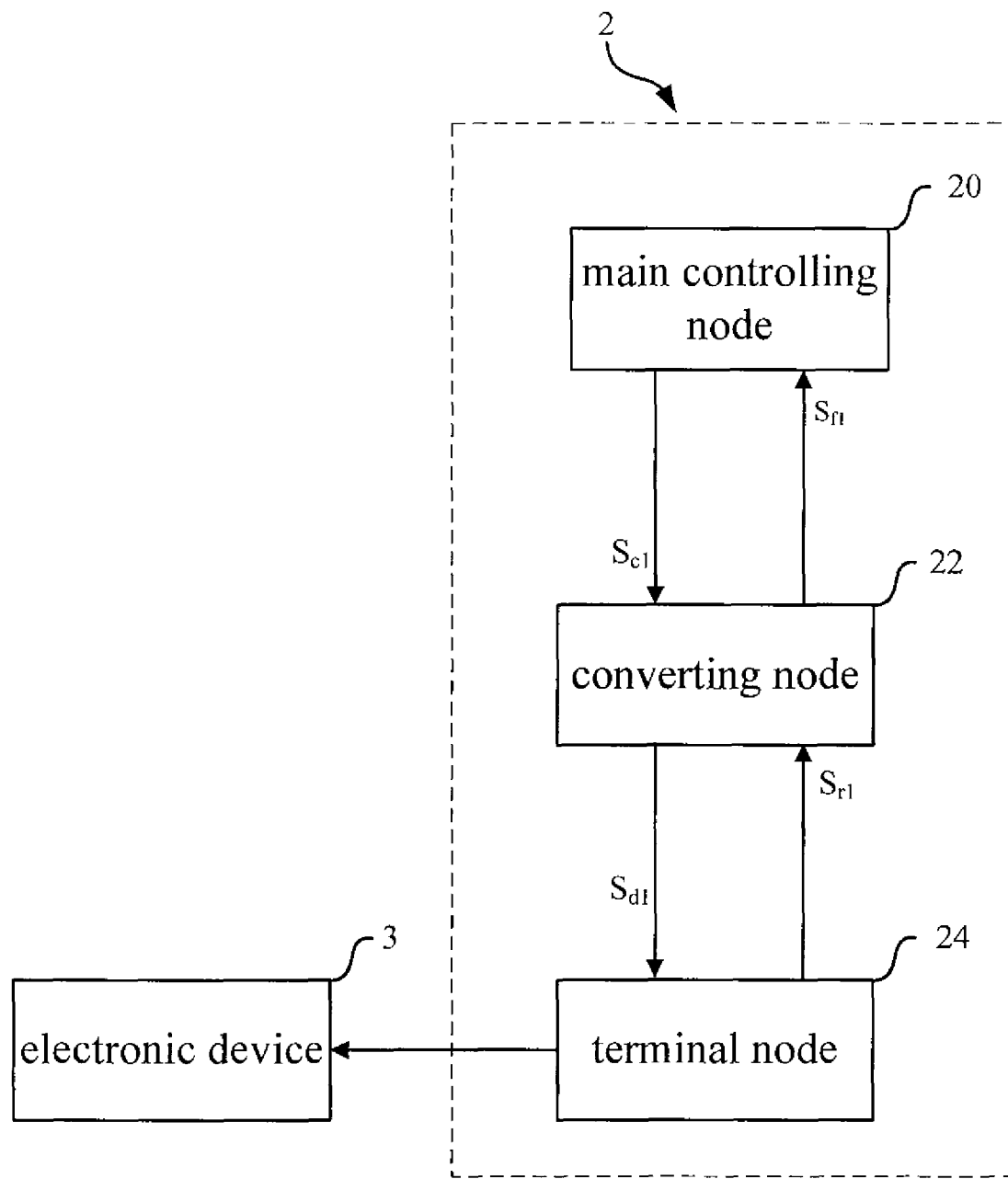
FIG. 1 illustrates a wireless sensing control network system according to an embodiment of the invention.

Please refer to FIG. 1. FIG. 1 illustrates a wireless sensing control network system 2 according to an embodiment of the invention. As illustrated in FIG. 1, the wireless sensing control network system 2 controls an electronic device 3 by means of a three-layer wireless control technique. The main controlling node could establish and control a plurality of converting nodes and a plurality of terminal nodes to provide the stable and simple wireless sensing control network system 2. In the embodiment, packets are transmitted according to 802.15.4/Zigbee communications protocol. The wireless sensing control network system 2 comprises a main controlling node 20, a converting node 22 and a terminal node 24.

The main controlling node 20 could scan a plurality of communication channels to establish and store a list of pointers for clean or undisturbed channels, based on the plurality of communication channels to select a present communication channel, so as to communicate with the next level (the converting node 22), and the main controlling node 20 could generate a controlling signal $S_{c1}$ and output the controlling signal $S_{c1}$ through the present communication channel.

Practically, the main controlling node 20 works as a central control unit of the wireless sensing control network system 2. The main controlling node 20 could monitor all of the operation in the system and give instructions to make sure that the wireless sensing control network system 2 operates at users' presetting.

The converting node 22 scans a plurality of communication channels, receives the controlling signal and the clean channel pointer list from the main controlling node 20 and stores the list of pointers for clean or undisturbed, communicates with the main controlling node 20 through the present communication channel via the controlling signal $S_{c1}$, and generates a driving signal $S_{d1}$ in accordance with the controlling signal $S_{c1}$ or users' operation on the converting node 22.

The terminal node 24 is connected to the electronic device 3, the terminal node 24 scans the plurality of communication channels before connecting to the present communication channel, receives the driving signal $S_{d1}$ and the clean channel pointer list from the converting node 22 through the present communication channel and store the clean channel pointer list, and transmit a response signal $S_{r1}$ to the converting node 22 through the present communication channel to communicate with the converting node 22 through the present communication channel.

Moreover, when the converting node 22 and the terminal node 24 are communicating with each other through the present communication channel, the converting node 22 transmits the driving signal $S_{d1}$ to the terminal node 24 through the present communication channel to make the terminal node 24 drive the electronic device 3 to operate according to the driving signal $S_{d1}$. Practically, the converting node 22 and the terminal node 24 could be plural modules, but not limited to a singular one. And the converting node 22 could control the plurality of terminal nodes 24 independently.

Figure 2:
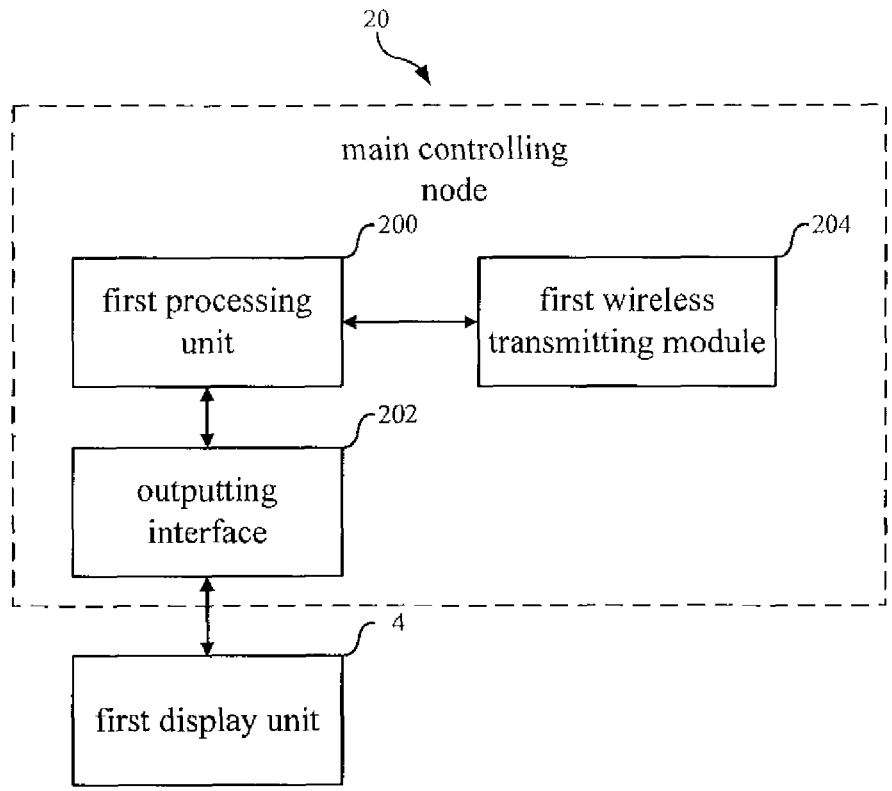
FIG. 2 is a functional block diagram illustrating the main controlling node in FIG. 1.

Please refer to FIG. 2. FIG. 2 is a functional block diagram illustrating the main controlling node 20 in FIG. 1. The main controlling node 20, the uppermost level of the wireless sensing control network system 2, is responsible for the network configuration, detection of channel disturbance, changing channels or instructions, etc, of the wireless sensing control network system 2. As illustrated in FIG. 2, the main controlling node 20 further comprises a first processing unit 200, an outputting interface 202 and a first wireless transmitting module 204.

The first wireless transmitting module 204 could scan the plurality of communication channels to select the present communication channel, and establish the list of pointers for clean or undisturbed channels, based on a plurality of present communication channels scanned. The first wireless transmitting module 204 could transmit the controlling signal $S_{c1}$ to the next level (the converting node 22) through the present communication channel. The controlling signal $S_{c1}$ could also perform the communication configuration with the next level and monitor if the channel is disturbed.

The first processing unit 200 is connected to the first wireless transmitting module 204, and is capable of generating the controlling signal $S_{c1}$ according to an instruction, wherein the instruction could be set by users or depending on the variation of environment such as the outdoor or indoor temperature, the quality of air or the movement of indoor personnel. The first processing unit 200 could generate an operation interface to store the clean channel pointer list.

The outputting interface 202 is connected to the first processing unit 200 and a first display unit 4 respectively, and is capable of receiving the operation interface from the first processing unit 200 and outputting the operation interface to the first display unit 4 to display, so as to provide a user with inputting the instruction or monitoring the wireless sensing control network system 2 through the operation interface of the first display unit 4, wherein the first display unit 4 could be, but not limited to, a touch screen or a remote control.

Figure 3:
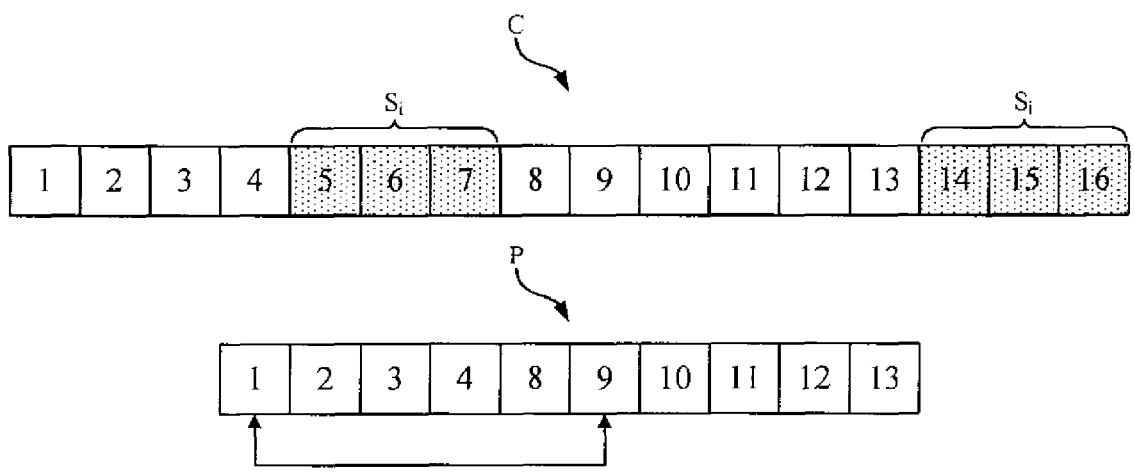
FIG. 3 illustrates channel-auto-management of the main controlling node.

Please refer to FIG. 3. FIG. 3 illustrates channel-auto-management of the main controlling node. As illustrated in FIG. 3, the first wireless transmitting module 20 scans the plurality of communication channels C (as the channel number 1-16 shown in the figure), eliminates the communication channels which are disturbed to a certain extent by the disturbing signal $S_i$ (e.g. the channel number 5, 6, 7, 14, 15 and 16 in the figure), and selects one of the communication channels (which are not disturbed by the disturbing signal $S_i$ to establish the list of pointers for clean or undisturbed channels) as the present communication channel P for the wireless sensing control network system 2. Practically, the invention provides rapidly channel switching to select and switch to the present communication channel which is located in the middle of the list of pointers for clean or undisturbed channels derived by eliminating the communication channel which is disturbed by the disturbing signal $S_i$, so as to avoid the influence of the adjacent communication channel of the disturbed communication channel and maintain the regular operation of the system. For example, when the communication channel 1 in FIG. 3 is disturbed, the system automatically switches to the communication channel located in the middle (e.g. the channel 9) of the list for pointers for clean or undisturbed channels.

Figure 4:
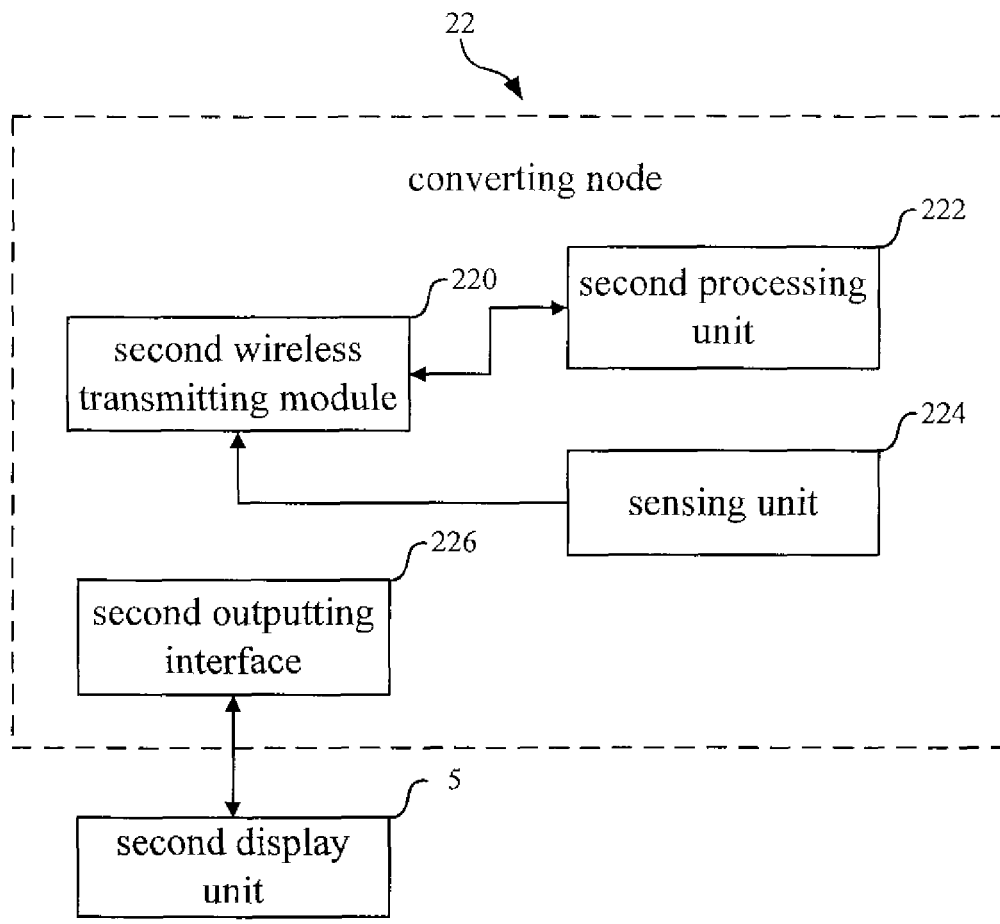
FIG. 4 is a functional block diagram illustrating the converting node in FIG. 1.

Please refer to FIG. 4. FIG. 4 is a functional block diagram illustrating the converting node 22 in FIG. 1. The converting node 22 is regarded as a message-managing and transmitting unit in the wireless sensing control network system 2. As illustrated in FIG. 4, the converting node 22 could further comprise a second wireless transmitting module 220 and a second processing unit 222, a sensing unit 224 and a second outputting/inputting interface 226 connected to a second display unit 5 to provide the user with inputting the instruction or operating the plurality of terminal nodes 26 commanded by the converting node 22 through an operation interface displayed on the second display unit 5. The sensing unit 224 senses the variation of environment to order the terminal node 26 to change its operation depending on the variation of environment.

Figure 5:
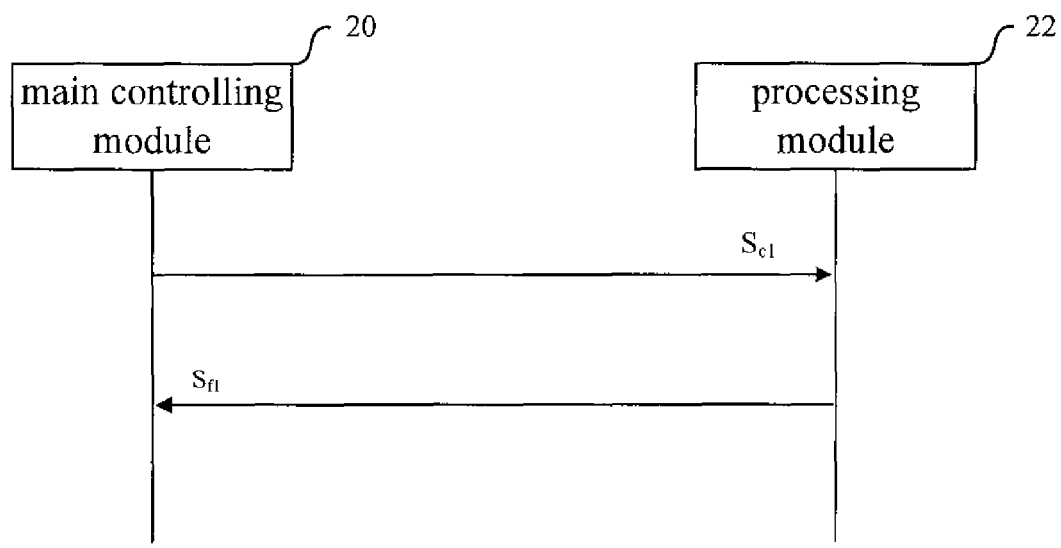
FIG. 5 illustrates the main controlling node and the converting node completing the auto-configuration and communicating with each other.

The second wireless transmitting module 220 receives the controlling signal $S_{c1}$ and the list of pointers for clean or undisturbed channels from the first wireless transmitting module 204 through the present communication channel. Please refer to FIG. 5. FIG. 5 illustrates the main controlling node 20 and the converting node 22 in completing the auto-configuration and communicating with each other. When the converting node 22 receives the controlling signal $S_{c1}$ or the converting node 22 is operated by users, the converting node 22 generates a confirming signal $S_{f1}$ according to the controlling signal $S_{c1}$ to inform the main controlling node 20 that the initial communication is achieved, and transmits the confirming signal $S_{f1}$ to the first wireless transmitting module 204 by the second wireless transmitting module 220 through the present communication channel P to process the signal processing by the main controlling node 20, so as to make the main controlling node 20 and the converting node 22 to complete auto-configuration by means of signal receiving and confirming. Practically, the first wireless transmitting module 204 transmits the list of pointers for clean or undisturbed channels together with the controlling signal to the second wireless transmitting module 220 through the present communication channels P.

The second processing unit 222 is connected to the second wireless transmitting module 220 for receiving the controlling signal $S_{c1}$ transmitted by the main controlling node 20 and for storing the list of pointers for clean channels, generates the driving signal $S_{d1}$ based on the controlling signal $S_{c1}$, and transmits the driving signal $S_{d1}$ by the second wireless transmitting module 220 through the present communication channel P.

Figure 6:
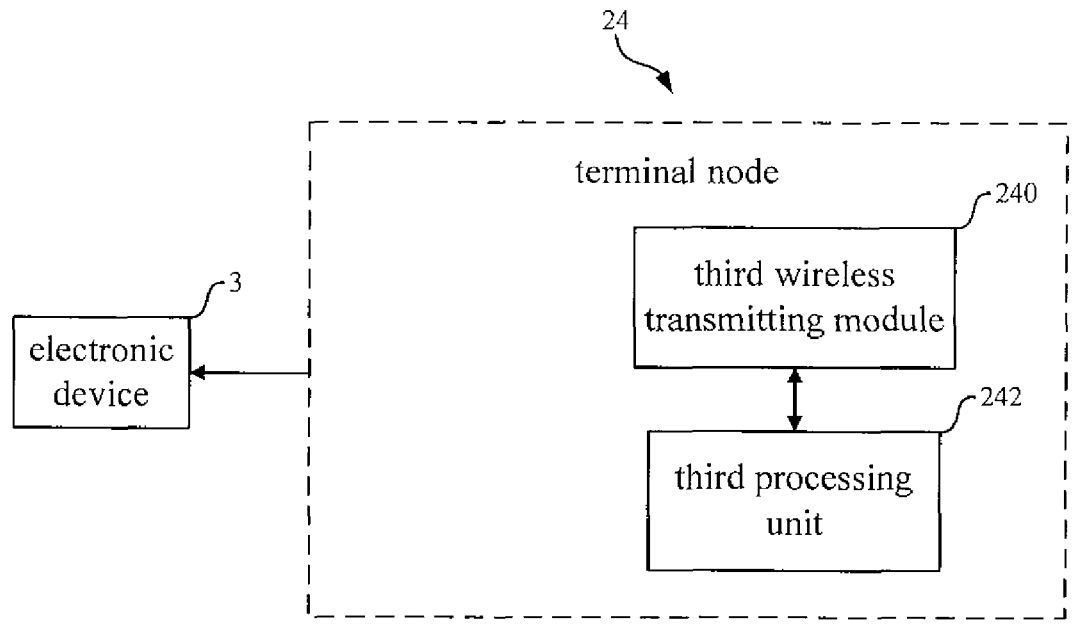
FIG. 6 is a functional block diagram illustrating the terminal node in FIG. 1 connected to an electronic device.

Please refer to FIG. 6. FIG. 6 is a functional block diagram illustrating the terminal node 24 in FIG. 1 connected to an electronic device 4. As illustrated in FIG. 6, the terminal node 24 further comprises a third wireless transmitting module 240 and a third processing unit 242.

The third wireless transmitting module 240 could automatically scan the plurality of communication channels to connect the present communication channel, and receives the driving signal $S_{d1}$ and the clean channel pointer list from the second wireless transmitting module 220 through the present communication channel.

The third processing unit 242 is connected to the third wireless transmitting module 240, for receiving the driving signal $S_{d1}$ and storing the list of pointers for clean channels, generating the response signal $S_{r1}$ according to the driving signal $S_{d1}$, and transmitting the response signal $S_{r1}$ to the second wireless transmitting module 220 to communicate with the converting node 22 by the third wireless transmitting 240 through the present communication channel.

Figure 7:
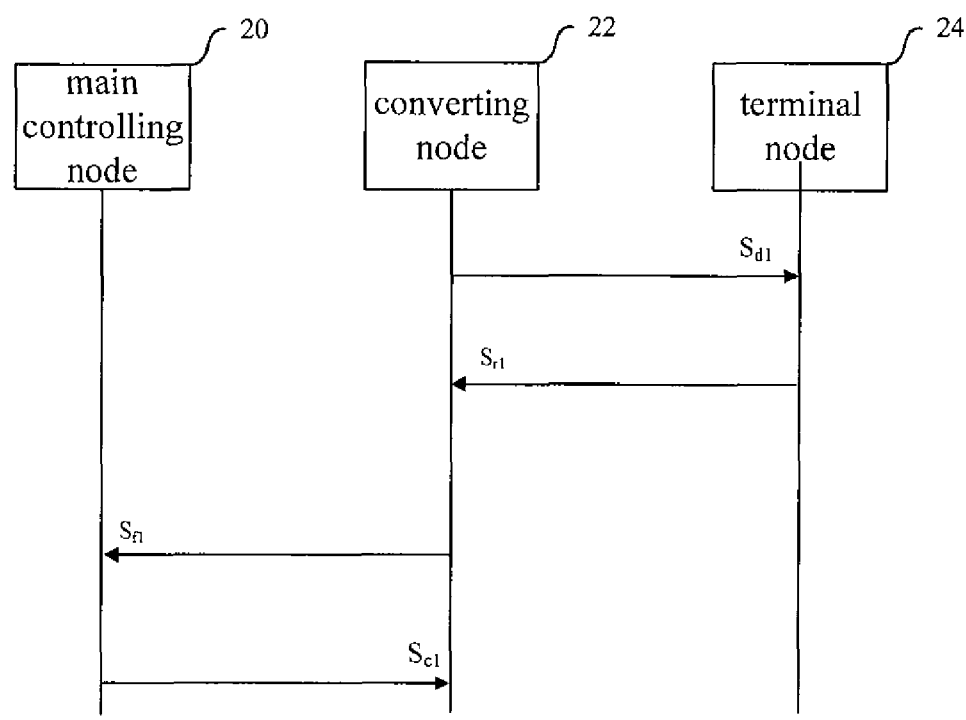
FIG. 7 illustrates the terminal node automatically configuring and automatically pairing.

Practically, the driving signal $S_{d1}$ could detect and judge if there is any terminal node 24 which has not completed the configuration with the converting node 22. If there is any terminal node 24 which has not completed the configuration existing, please refer to FIG. 7 which illustrates the terminal node 24 automatically configuring and automatically pairing. As illustrated in FIG. 7, the terminal node 24 could complete the auto-configuration with the converting node 22 by means of the driving signal $S_{d1}$ to communicate with the main controlling node 20, so that the purpose of automatically setting up and automatically pairing of the invention is thus achieved. Therefore, according to the wireless sensing control network system 2 of the invention, the number of the terminal node 24 could be increased depending on users' requirement, and the wireless sensing control network system 2 could be set up on one's own without professionals.

As for each kind of generated and transmitted signals mentioned above, please refer to FIG. 8A and FIG. 8B simultaneously. FIG. 8A illustrates distinguishing an error signal in the invention, and FIG. 8B illustrates correcting an error signal in the invention. As illustrated in the figure, the same signals are continuously transmitted at lease twice in the wireless sensing control network system 2 and analyzed by the processing unit of each module (the main controlling node 20, the converting node 22 and the terminal node 24). Take a binary code as an example, when the first transmitted byte and the second transmitted byte are compared and judged as zero, then the signals are considered as correct signals; if the first transmitted byte and the second transmitted byte are compared and judged as not equal to zero, then the signals are considered as error signals, therefore the processing unit will request the upper level of processing unit to transmit signals again.

The terminal node 24 could be further connected to the electronic device 4. The electronic device 4 comprises a lighting module, and the lighting module could be light emitting diodes or fluorescents. The terminal node 24 could drive the lighting module to light in a default mode according to the driving signal $S_{d1}$. The default mode comprises a specific color temperature or a specific brightness.

Practically, the default lighting mode could be set according to the variation of environment. For example, when the temperature of the environment is high, the lighting module provides cool color temperature (e.g. 6000K); on the contrary, if the temperature of the environment is low, the lighting module provides warm color temperature (e.g. 3000K). Thus, users' vision and feeling could be influenced by means of changing the color temperature of the man-made light source.

Moreover, if the air quality of the environment is fine, the lighting module provides gentile color of light; but if the air quality of the environment is bad, the lighting module provides warning color of light (e.g. red) to remind users.

Furthermore, when users enter an indoor space, the system orders the lighting module to output light with sufficient brightness for working; if users or personnel leave, the system orders the lighting module to turn off to save the energy. In a parking area, the system could help drivers and lead drivers to park the car properly by means of the variation of light according to the movements of the car.

However, the terminal node 24 could be integrated in the electronic device 4, or designed separately and connected afterward to control. Thus, the terminal node 24 mentioned in the invention could be suitable for driving general lighting apparatus without any specific electronic device 4.

Figure 9:
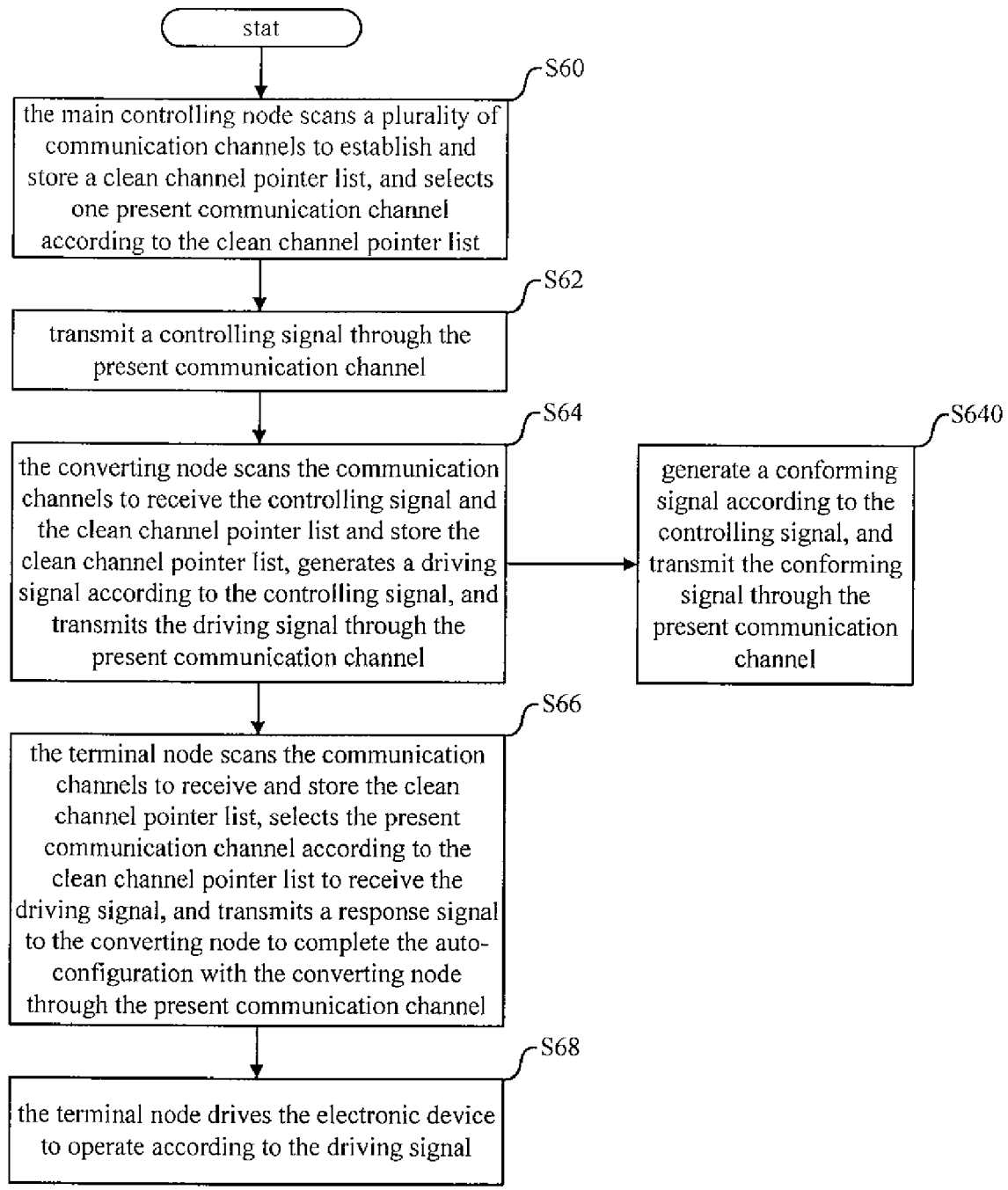
FIG. 9 is a flow chart illustrating the operating method according to an embodiment of the invention.

Please refer to FIG. 9. FIG. 9 is a flow chart illustrating the operating method according to an embodiment of the invention. The wireless sensing control method is applied to a wireless sensing control network system for controlling an electronic device. The wireless sensing control network system comprises a main controlling node, a converting node and a terminal node connected to the electronic device. The wireless sensing control method comprises the following steps.

Firstly, step S60 is performed to control the main controlling node to scan a plurality of communication channels to establish and store a clean channel pointer list, and select one present communication channel according to the clean channel pointer list. Secondly, step S62 is performed to transmit a controlling signal through the present communication channel. Practically, the controlling signal could perform the communication configuration with the next level simultaneously and detect the extent of disturbance of the channels.

After that, step S64 is performed to control the converting node to scan the plurality of communication channels to receive the controlling signal and the list of pointers for clean or undisturbed channels and store the list of pointers for clean or undisturbed channels, generate a driving signal according to the controlling signal, and transmit the driving signal through the present communication channel. Meanwhile, step S640 is performed to control the converting node to generate a conforming signal according to the controlling signal, and transmit the conforming signal to the main controlling node through the present communication channel to make the converting node and the main controlling node complete the auto-configuration. Subsequently, step S66 is performed to control the terminal node to scan the plurality of communication channels to receive and store the clean channel pointer list, select the present communication channel according to the clean channel pointer list to receive the driving signal, and transmit a response signal to the converting node through the present communication channel to complete the auto-configuration with the converting node through the present communication channel. Practically, the configuration and the pairing method between the terminal node and the converting node are mentioned above, thus the details are not described again here. In the embodiment, when the converting node detects another terminal node, the another terminal node generates a response signal to the converting node according to the driving signal to complete pairing.

Finally, step S68 is performed to control the terminal node to receive the driving signal through the present communication channel and drive the electronic device to operate according to the driving signal when the terminal node is communicating with the converting node through the present communication channel.

The electronic device further comprises a lighting module, and according to the driving signal, the wireless sensing control network system drives the lighting module to light in a default mode. Practically, the default mode comprises a specific color temperature or a specific brightness.

Please refer to FIG. 8A and FIG. 8B, the wireless sensing control method of the invention comprises a technique of distinguishing between correct signal and error signal. Practically, the controlling signal, the driving signal, the response signal and the confirm signal are continuously transmitted twice, and according to the concept of exclusive XOR gate, when the summary of the two transmitted signals calculated by an XOR gate is zero, the XOR gate judges the signals as correct signals; on the contrary, if the summary of the two transmitted signals calculated by an XOR gate is not equal to zero, the XOR gate judges the signals as error signals.

Figure 10:
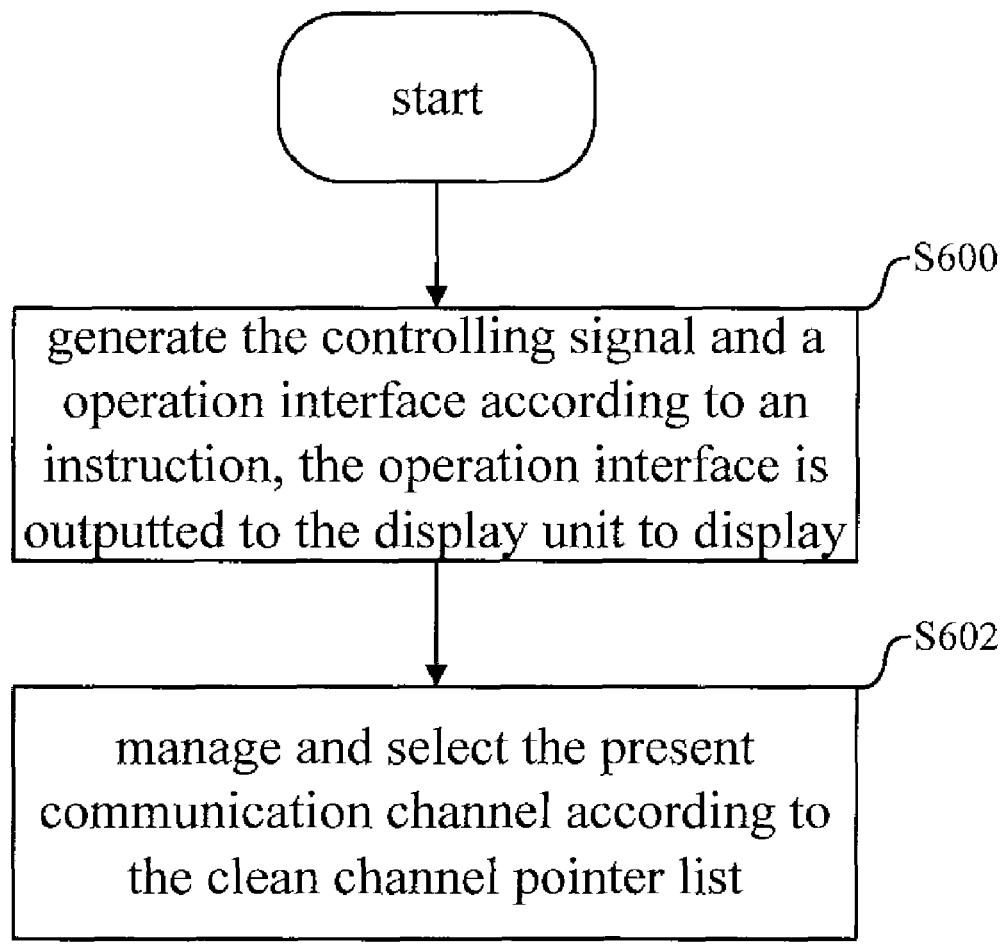
FIG. 10 illustrates a detailed flow chart of the step S60 in FIG. 9.

Please refer to FIG. 10. FIG. 10 illustrates a detailed flow chart of the step S60 in FIG. 9. The wireless sensing control network system further comprises a display unit. Firstly, step S600 is performed to generate the controlling signal and an operation interface according to an instruction, and the operation interface is outputted to the display unit to display. The display unit could be, but not limited to, a touch panel or a remote control. Users are capable of inputting the instruction through the operation interface. Subsequently, in step S602, the wireless sensing control network system manages and selects the present communication channel according to the clean channel pointer list.

To summarize, the wireless sensing control network system and the operating method thereof comprises mainly: (1) channel-management and channel-changing method; (2) auto-configuration method; (3) terminal node configuration method; (4) terminal node pairing method; (5) network control method and (6) technology for distinguishing between correct signal and error signal. Thereby, the wireless sensing control network system and operating method thereof of the invention could build up a three-layer wireless control system, and the reliability of the wireless control is thus improved. Moreover, the converting node of the wireless sensing control network system communicates with the main controlling node and the converting nodes automatically by means of signal transmitting, and the main controlling node could automatically scan and select appropriate communication channel for the wireless sensing control network system, so that the wireless sensing control network system is easily set up and controlled.

Although the present invention has been illustrated and described with reference to the preferred embodiment thereof, it should be understood that it is in no way limited to the details of such embodiment but is capable of numerous modifications within the scope of the appended claims.

What is claimed is:

1. A wireless sensing control network system for controlling an electronic device, the wireless sensing control network system comprising:

a main controlling node scanning a plurality of communication channels, for establishing and storing a list of pointers for undisturbed channels not disturbed by a disturbing signal based on the plurality of communication channels scanned, selecting one present communication channel from the list of pointers, and the main controlling node generating a controlling signal and outputting the controlling signal through the present communication channel;

a converting node scanning a plurality of communication channels, for receiving the controlling signal and the list of pointers from the main controlling node and storing the list of pointers, communicating with the main controlling node through the present communication channel based on the controlling signal, and generating a driving signal in accordance with the controlling signal; and a terminal node connected to the electronic device, the terminal node scanning the plurality of communication channels to channel in with the present communication channel, receiving the driving signal and the list of pointers from the present communication channel and storing the list of pointers, and transmitting a response signal to the converting node through the present communication channel to communicate with the converting node through the present communication channel;

wherein when the converting node and the terminal node are communicating with each other through the present communication channel, the converting node transmits the driving signal to the terminal node through the present communication channel to make the terminal node drive the electronic device to operate in accordance with the driving signal.

2. The wireless sensing control network system of claim 1, wherein the main controlling node further comprises:

a first wireless transmitting module for scanning the plurality of communication channels to select the present communication channel and establishing the list of pointers based on a plurality of present communication channels;

a first processing unit connected to the first wireless transmitting module, for generating the controlling signal according to an instruction, and the first processing unit generating an operation interface and storing the list of pointers; and a first outputting interface connected to the first processing unit and a first display unit respectively, for receiving the operation interface from the first processing unit, and outputting the operation interface to the first display unit to display, so as to provide a user with inputting the instruction through the operation interface.

3. The wireless sensing control network system of claim 2, wherein the first wireless transmitting module selects and switches the present communication channel according to the list of pointers.

4. The wireless sensing control network system of claim 2, wherein the converting node further comprises:

a second wireless transmitting module for receiving the controlling signal and the list of pointers from the first wireless transmitting module through the present communication channel;

a second processing unit connected to the second wireless transmitting module, for receiving the controlling signal and storing the list of pointers, generating the driving signal according to the controlling signal, and transmitting the driving signal by the second wireless transmitting module through the present communication channel; and a sensing unit sensing the variation of environment to order the terminal node to change its operation depending on the variation of environment; and a second outputting interface externally connected to a display unit to provide the user with inputting the instruction or operating the plurality of terminal nodes commanded by the converting node through an operation interface displayed on the display unit.

5. The wireless sensing control network system of claim 4, wherein when the converting node receives the controlling signal, the converting node generates a confirming signal according to the controlling signal and transmits the confirming signal to the first wireless transmitting module by the second wireless transmitting module through the present communication channel to make the main controlling node and the converting node to complete auto-configuration and communicate with each other.

6. The wireless sensing control network system of claim 4, wherein the terminal node further comprises:

a third wireless transmitting module for scanning the plurality of communication channels to channel in with the present communication channel, and receiving the driving signal and the list of pointers list from the second wireless transmitting module through the present communication channel; and a third processing unit connected to the third wireless transmitting module, for receiving the driving signal and storing the list of pointers, generating the response signal according to the driving signal, and transmitting the response signal module to the second wireless transmitting module to communicate with the converting node by the third wireless transmitting through the present communication channel.

7. The wireless sensing control network system of claim 1, wherein the terminal node is further connected to the electronic device, for controlling the electronic device to operate according to the driving signal.

8. The wireless sensing control network system of claim 1, wherein the electronic device comprises a lighting module, and according to the driving signal, the terminal node drives the lighting module to light in a default mode.

9. The wireless sensing control network system of claim 8, wherein the default mode comprises a specific color temperature or a specific brightness.

10. The wireless sensing control network system of claim 1, wherein the terminal node is integrated in the electronic device.

11. A wireless sensing control method applied to a wireless sensing control network system for controlling an electronic device, the wireless sensing control network system comprising a main controlling node, a converting node and a terminal node connected to the electronic device, the wireless sensing control method comprising the following steps:

(a) controlling the main controlling node to scan a plurality of communication channels to establish and store a list of pointers for undisturbed channels not disturbed by a disturbing signal, selecting one present communication channel from the list of pointers, and transmitting a controlling signal through the present communication channel;

(b) controlling the converting node to scan the plurality of communication channels to receive the controlling signal and the list of pointers and store the list of pointers, generating a driving signal according to the controlling signal, and transmitting the driving signal through the present communication channel;

(c) controlling the terminal node to scan the plurality of communication channels to receive and store the list of pointers, selecting the present communication channel according to the list of pointers to receive the driving signal, and transmitting a response signal to the converting node through the present communication channel to complete the auto-configuration with the converting node through the present communication channel; and (d) driving the electronic device to operate according to the driving signal when the terminal node is communicating with the converting node through the present communication channel.

12. The wireless sensing control method of claim 11, wherein the wireless sensing control network system comprises a display unit, and the step (a) further comprises the following steps:
- (a1) generating the controlling signal and a operation interface according to an instruction, the operation interface being output to the display unit for display to allow a user for inputting the instruction through the operation interface; and
- (a2) managing and selecting the present communication channel according to the list of pointers for undisturbed channels.

13. The wireless sensing control method of claim 11, wherein the step (b) further comprises the following step:
- (b1) controlling the converting node to generate a conforming signal according to the controlling signal, and transmitting the conforming signal to the main controlling node through the present communication channel to make the converting node and the main controlling node to complete the auto-configuration.

14. The wireless sensing control method of claim 13, wherein the controlling signal, the driving signal, the response signal and the confirming signal are continuously transmitted twice, and when the summary of the two transmitted signals calculated by an XOR gate are zero, the XOR gate judges the signals as correct signals.

15. The wireless sensing control method of claim 11, wherein when the converting node detects another terminal node, the another terminal node generates a response signal to the converting node according to the driving signal to complete pairing.

16. A wireless sensing control method of claim 11, wherein the electronic device further comprises a lighting module, and according to the driving signal, the terminal node drives the lighting module to light in a default mode in the step (d).

17. A wireless sensing control method of claim 16, wherein the default mode comprises a specific color temperature or a specific brightness.

* * * * *